Feb. 2, 1971

J. R. KENCH ET AL 3,560,172

IRON-SILICON MAGNETOSTRICTIVE LAMINATED MATERIAL AND ELEMENTS

Filed May 31, 1968

SILICON-IRON LAMINATIONS TO BE JOINED

COPPER PLATE BOTH LAMINATIONS

SILVER PLATE ONE LAMINATION

DIFFUSION BRAZE TO FORM MAGNETOSTRICTIVE LAMINATED MATERIAL

LAMINATED MATERIAL WITH COPPER-SILVER ALLOY LAYER

INVENTORS
JOHN R. KENCH
ALLAN PIERSKALLA

BY

ATTORNEY.

PICKLE SILICON-IRON MATERIAL IN 26N HF ACID FOR ABOUT 5—15 MINUTES AT ROOM TEMPERATURE AND WASH WITH WATER.

OPTIONAL

IMMERSE IN ACID SOLUTION (SUCH AS 5 PARTS $HNO_3$, 3 PARTS HF, 3 PARTS $CH_3COOH$) FOR ABOUT 2-4 SECONDS AT ROOM TEMPERATURE AND RINSE IMMEDIATELY.

REPEAT PRECEDING STEPS IF THE GRAINS DO NOT APPEAR.

IMMERSE IN 10% BY WEIGHT CAUSTIC POTASH FOR ABOUT 5 MINUTES AT ROOM TEMPERATURE AND WASH THOROUGHLY IN WATER.

RINSE WITH METHYL ALCOHOL SPRAY (A.R. GRADE) AND DRY (PREFERABLY WITH A HOT AIR BLAST).

Fig 2

INVENTORS
JOHN R. KENCH
ALLAN PIERSKALLA
BY
ATTORNEY.

Fig 3

| REPRESENTATIVE COPPER FLASH PLATING BATH ||
|---|---|
| MATERIAL | GRAMS PER LITER |
| COPPER CYANIDE   CuCN | 22.5 |
| POTASSIUM CYANIDE   KCN | 34.0 |
| POTASSIUM CARBONATE $K_2CO_3$ | 15.0 |

Fig 4

| REPRESENTATIVE COPPER PLATING BATH ||
|---|---|
| MATERIAL | GRAMS PER LITER |
| COPPER SULPHATE   $CuSO_4$ | 250 |
| SULPHURIC ACID   $H_2SO_4$ (36N) | 75 |

Fig 5

| REPRESENTATIVE SILVER PLATING BATH ||
|---|---|
| MATERIAL | GRAMS PER LITER |
| SILVER CYANIDE   AgCN | 5.25 |
| POTASSIUM CYANIDE   KCN | 90 |
| POTASSIUM HYDROXIDE   KOH | AS REQUIRED TO SATURATE THE SOLUTION |

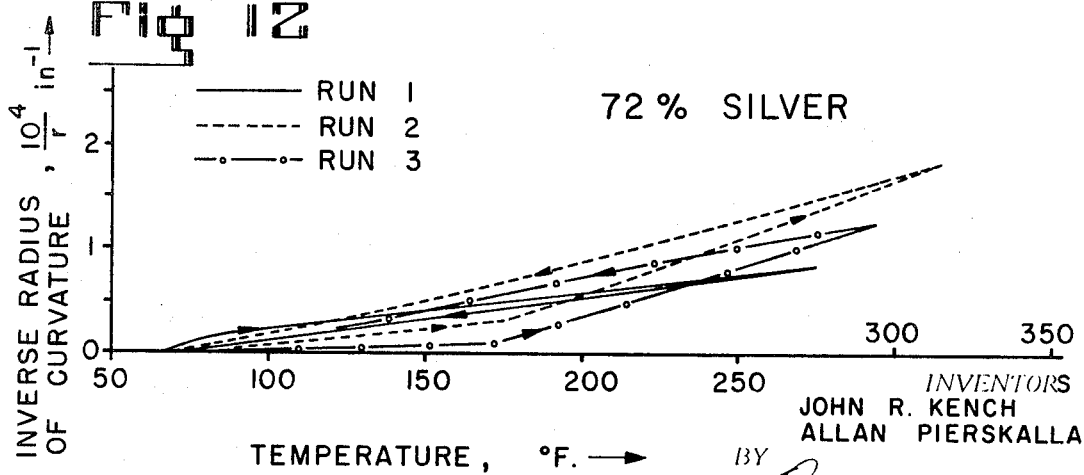

Fig 12

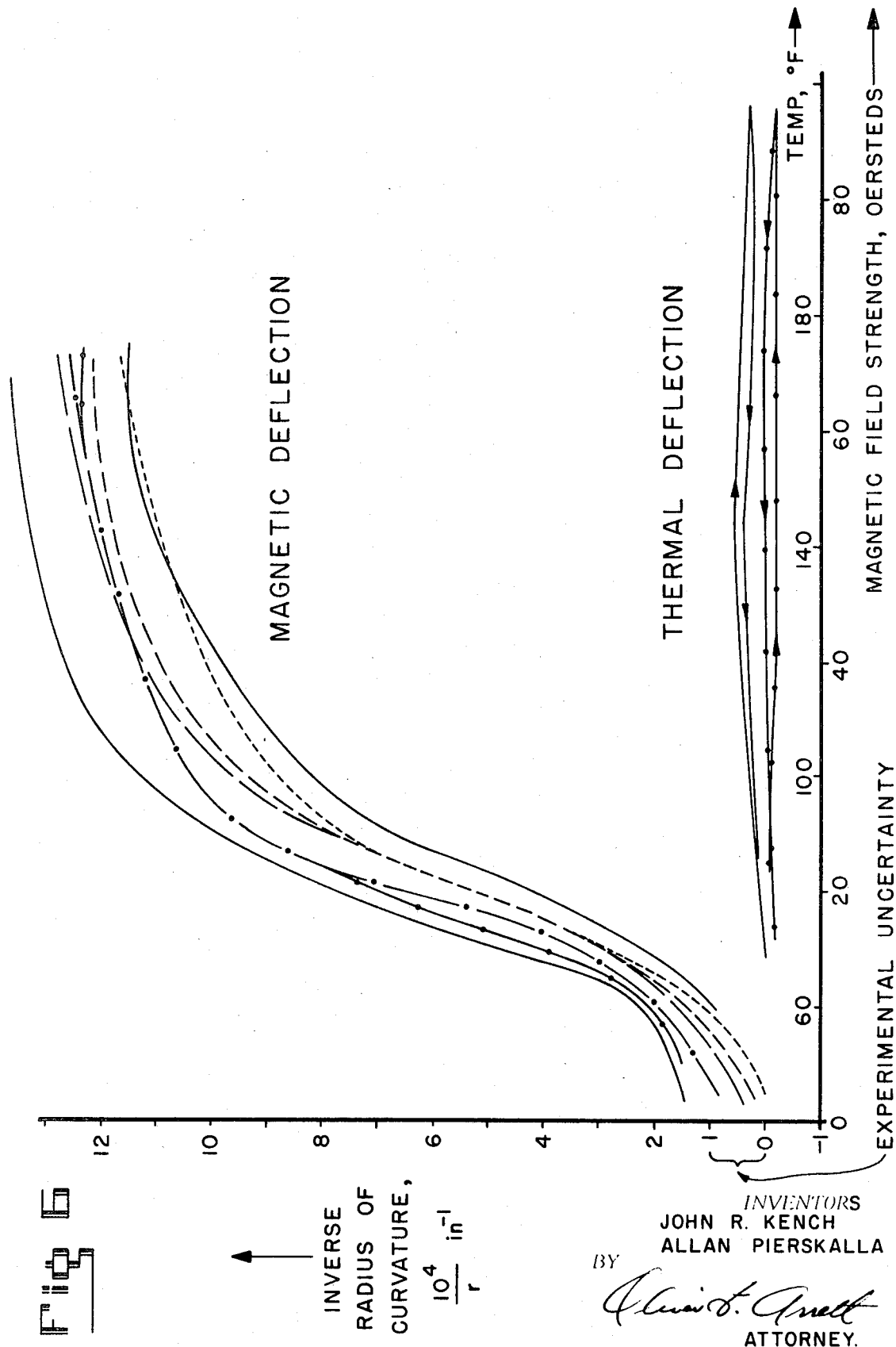

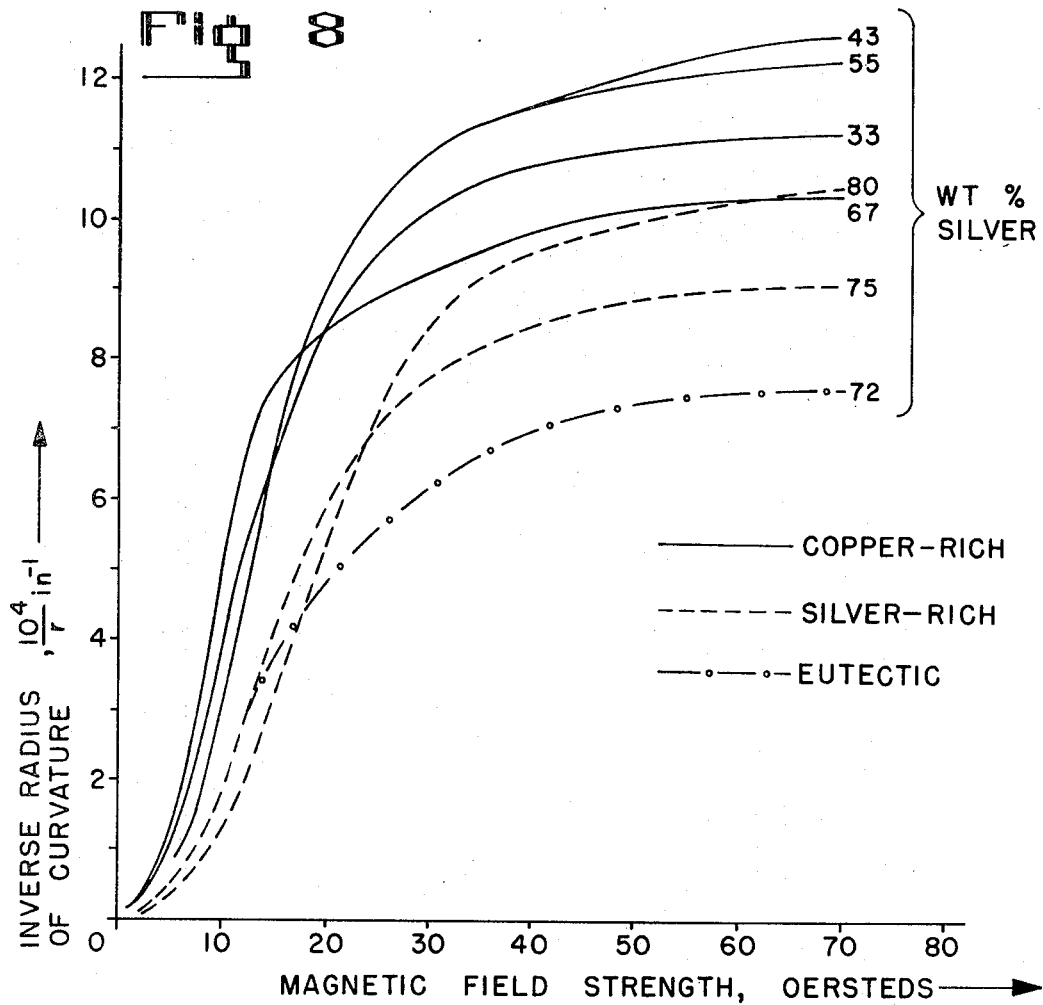
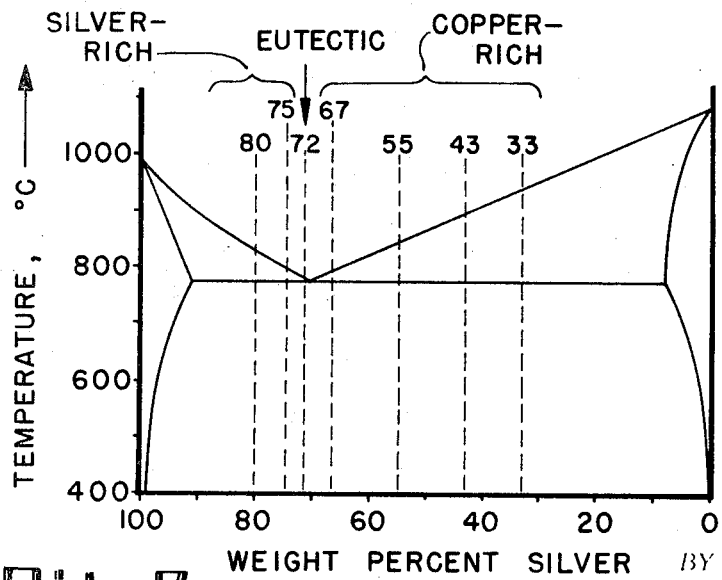

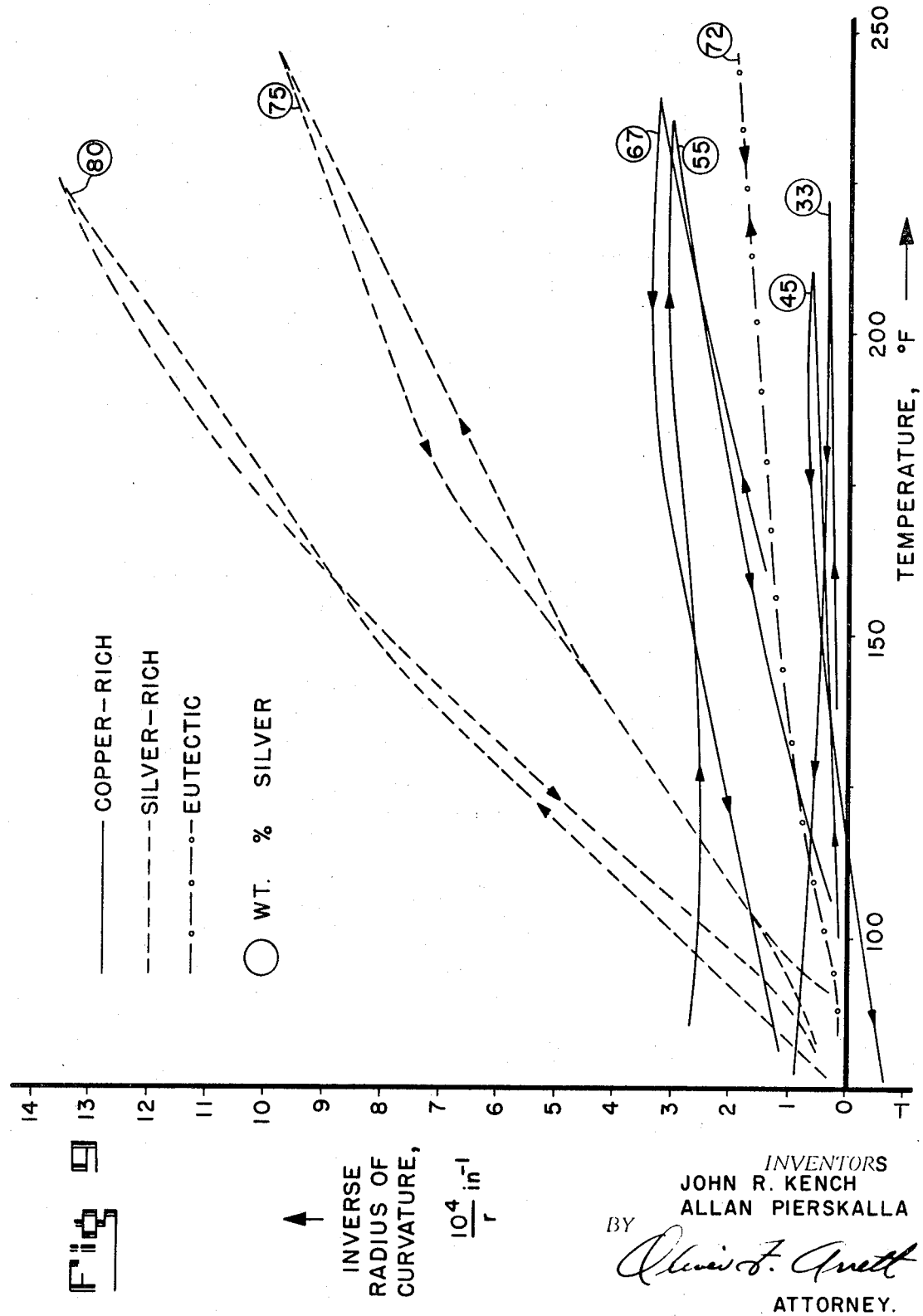

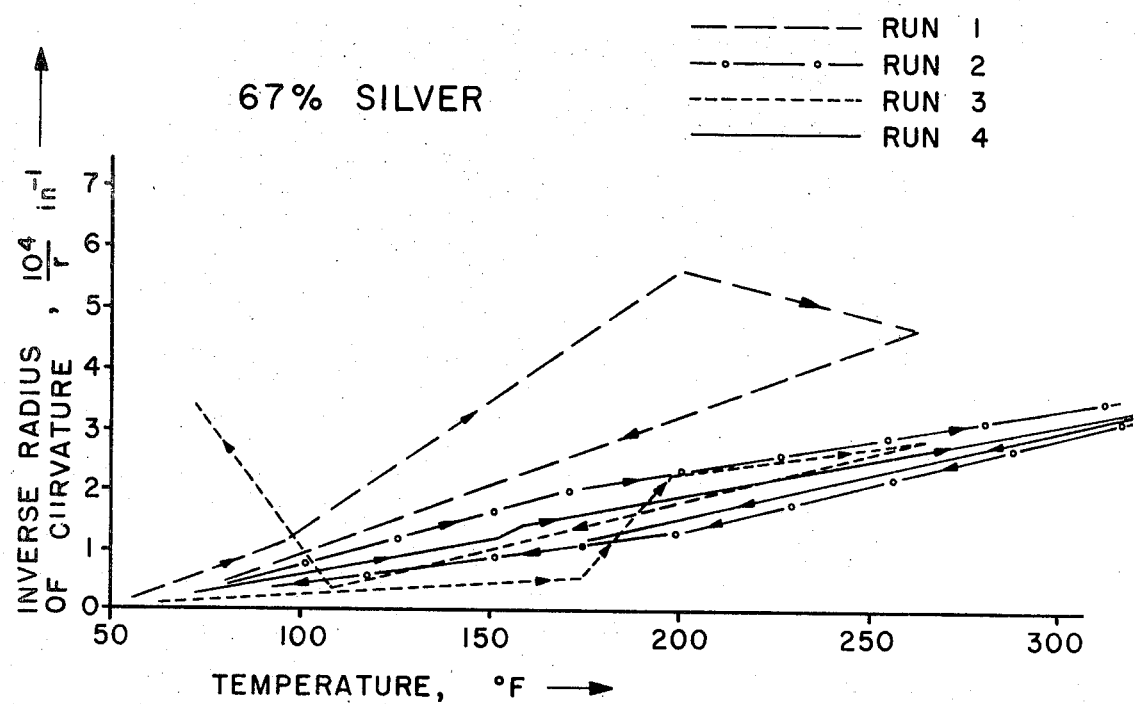
Fig 11 — 67% SILVER
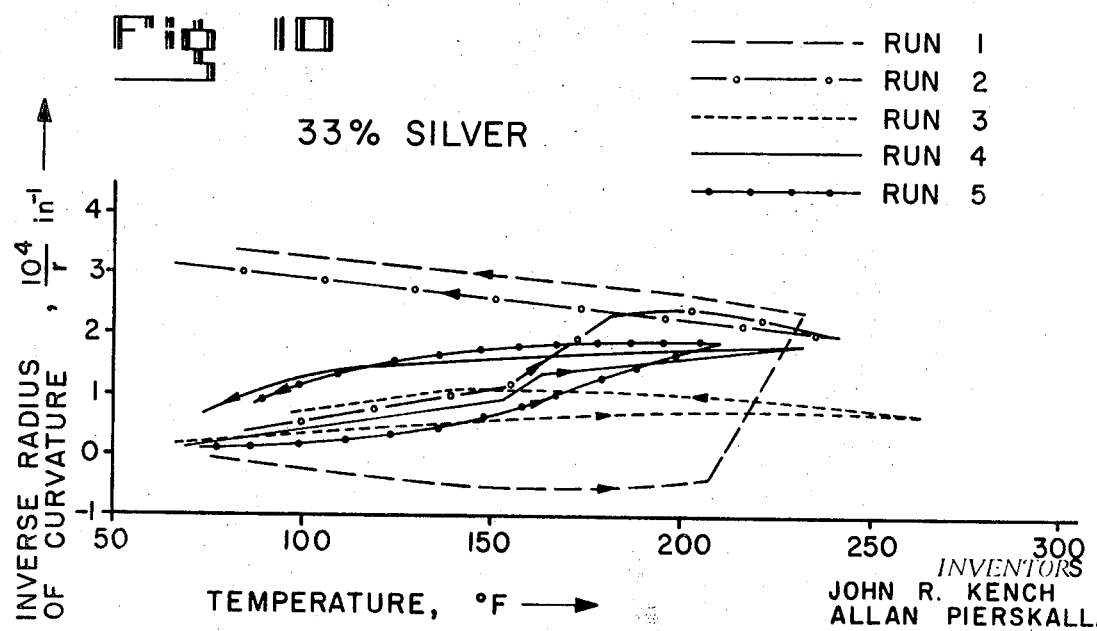
Fig 10 — 33% SILVER
INVENTORS
JOHN R. KENCH
ALLAN PIERSKALLA
BY
ATTORNEY.

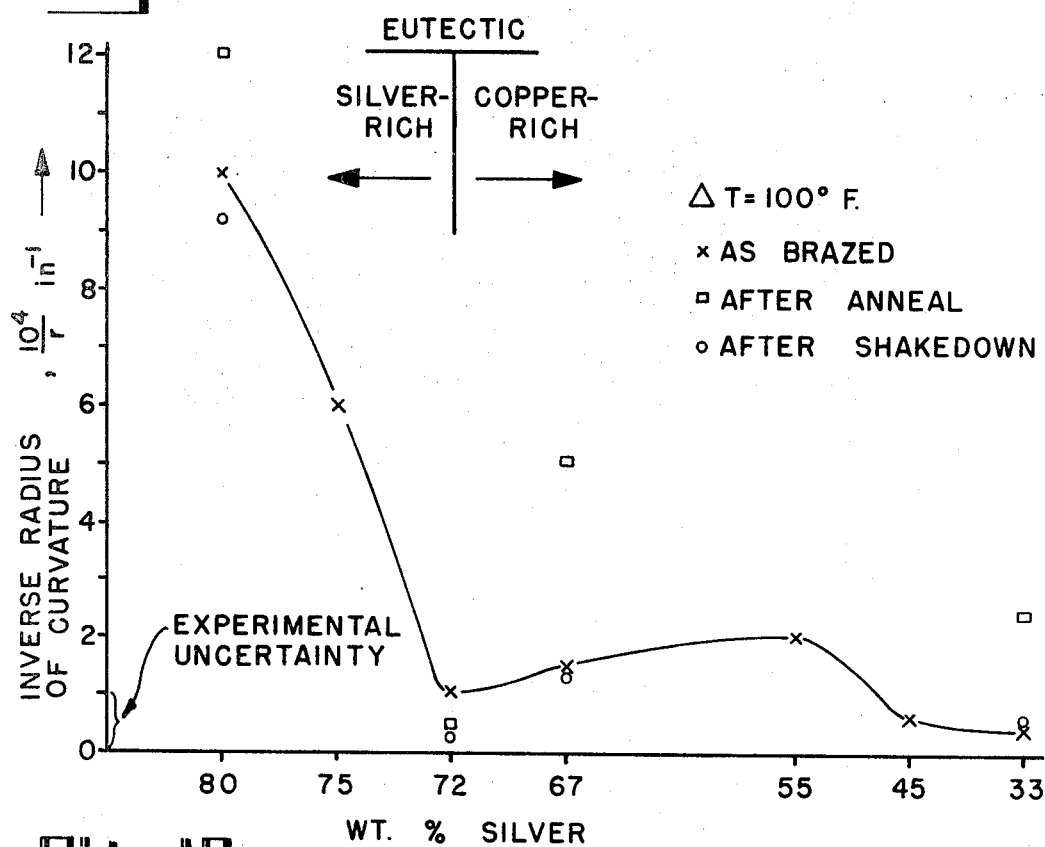
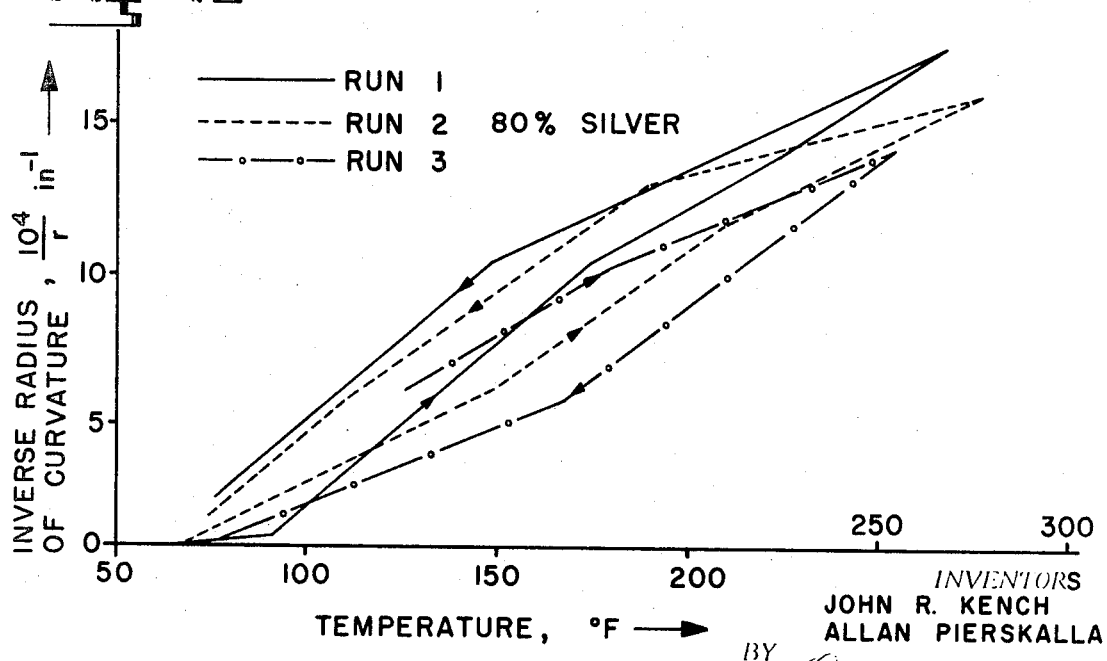

United States Patent Office 3,560,172
Patented Feb. 2, 1971

3,560,172
IRON-SILICON MAGNETOSTRICTIVE LAMINATED MATERIAL AND ELEMENTS
John R. Kench, Minneapolis, and Allan Pierskalla, St. Louis Park, Minn., assignors to Honeywell Inc., a corporation of Delaware
Filed May 31, 1968, Ser. No. 733,650
Int. Cl. B32b *15/00*
U.S. Cl. 29—196.3                                   6 Claims

ABSTRACT OF THE DISCLOSURE

A laminated magnetostrictive material consisting of silicon-iron laminations joined by a layer of a copper-silver alloy and method of making the material.

BACKGROUND

Magnetostrictive bimetal elements are composite structures consisting of two or more layers or laminations of magnetostrictive materials which bend or deflect in a magnetic field. They are thus analogous to thermostatic bimetal strips which bend with a temperature change.

Magnetostrictive elements are used in devices which convert an electrical signal to a mechanical force or movement but have an advantage over traditional electro-magnetic transducers in that the mechanical output is proportional to the electrical input. They may therefore be regarded as analogue rather than digital devices.

Their mode of operation is simple. Laminations or layers of ferro magnetic material are selected which have different magnetostrictive characteristics. In an applied magnetic field, if two or more laminations are joined together, the resulting composite structure will bend or flex.

Two classes of laminated material are distinguished depending on whether the layers making up the laminated material are of the same chemical composition or not.

If the laminations are of different compositions, for example a nickel layer and a nickel-iron alloy layer, each layer will exhibit a magnetostrictive coefficient characteristic for its particular composition. Unfortunately, each layer will also have a different thermal expansion coefficient and the material will behave as a thermostatic bimetal as well as a magnetostrictive one. Magnetic strains or deflections may then be obscured or otherwise inhibited by thermal strains or deflections.

Temperature stability is usually provided in this type of composite by a third layer or lamination selected for its compensating thermal expansion characteristics, referred to herein as compensated trimetal material and trimetal elements. Material and elements of this type are described in detail in U.S. Pat. 3,378,357. At best, this type of temperature compensation can only be effective over a limited temperature range since the thermal expansion characteristics of all three materials change with temperature.

Copending U.S. patent application filed of even date herewith entitled "Magnetostrictive Material and Elements" in the name of John R. Kench and Jack A. Sartell, discloses a second class of laminated material and elements prepared therefrom wherein the laminations or layers are of the same chemical composition. The referenced application discloses a preferred laminated material of the second class which utilizes layers of textured silicon-iron alloy. For example, in sheet form a 3% silicon, balance essentially iron, material is available with the "cube-on-edge" texture. From the sheet, layers may be taken which have either a (100) or (111) crystalline alignment along their length. Laminated material prepared from layers having such relative orientation produces maximum magnetostrictive effect since the (100) alignment exhibits positive magnetostriction while the (111) alignment exhibits negative magnetostriction. Furthermore, since silicon-iron has cubic symmetry, both layers have essentially the same thermal expansion coefficient. Consequently, anisotropic composites of this type are intrinsically temperature stable. This class of material is more fully described in the referenced patent application. The term "anisotropic" is used herein to refer to the different magnetostrictive coefficients exhibited by silicon-iron laminations of different texture.

SUMMARY

The silicon-iron anisotropic laminated magnetostrictive materials are of specific interest herein since the present invention relates to a new and improved silicon-iron laminated material wherein the laminations or layers are joined by a copper-silver alloy layer of a particular compositional range. The present invention is also concerned with a preferred method for securing the laminations together with the copper-silver alloy layer to form the laminated material. In its preferred embodiment the layers are secured together along their contiguous surfaces so that a change in the length of one layer causes flexing of the entire composite or laminated material.

Specifically, it has been found that copper-silver alloys provide excellent bonding layers for joining layers of silicon-iron alloy, provided a proper choice is made of copper-silver composition. Differential thermal expansion between the silicon-iron layers and the copper-silver alloy layer leads to the generation of undesirably high internal stresses if high silver compositions are employed. Laminated material prepared with high silver content in the joining alloy layer has been found to be permanently temperature sensitive. This effect may be due to the great disparity between the temperature coefficients of silver and iron. Certain copper-silver alloys with lower silver content have been found to possess a more closely matched temperature coefficient with respect to the silicon-iron alloys and are used in accordance with this invention to prepare laminated magnetostrictive material and magnetostrictive elements which exhibit negligible temperature sensitivity.

BRIEF DESCRIPTION OF THE DRAWING

FIG. 2 is a flow diagram illustrating a preferred cleaning procedure for use with the silicon-iron material;

FIG. 3 is a table illustrating a plating bath which has been used to flash plate the material shown in FIG. 1 with copper;

FIG. 4 is a table illustrating a plating bath which has been used to copper plate the material shown in FIG. 1;

FIG. 5 is a table illustrating a plating bath which has been used to silver plate the material shown in FIG. 1;

FIG. 6 is a graph showing the magnetic and temperature deflections of several magnetostrictive elements made from pressure welded laminated material;

FIG. 7 is the phase diagram for copper-silver showing several braze compositions used to prepare laminated magneto-strictive materials;

FIG. 8 is a graph showing the magnetic deflections for composites wherein the silicon-iron laminations are joined by various copper-silver alloy layers of different composition;

FIG. 9 is a graph showing the thermal deflection for the laminated materials shown in FIG. 8;

FIG. 10 is a graph showing the thermal deflection, during repeated temperature cycles for laminated material wherein the silicon-iron laminations are joined by an alloy layer of about 33% silver, balance essentially copper;

FIG. 11 is another graph showing the thermal deflection, during repeated temperature cycles, for a laminated material wherein the silicon-iron laminations are joined by an alloy layer of about 67% silver, balance essentially copper;

FIG. 12 is a graph showing the thermal deflection, during repeated temperature cycles, for a silicon-iron material wherein the laminations are joined by the copper-silver eutectic alloy of about 72% silver, balance essentially copper;

FIG. 13 is a graph showing the thermal deflection, during repeated temperature cycles, for a silicon-iron material wherein the laminations are joined by an alloy of about 80% silver, balance essentially copper;

FIG. 14 is a graph showing the temperature sensitivity under several different conditions for silicon-iron laminations joined by various copper-silver alloys.

DESCRIPTION OF THE PREFERRED EMBODIMENTS

Figure 1A:
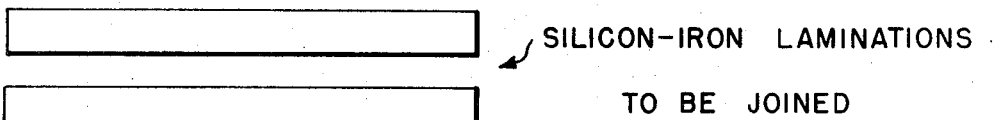
FIGS. 1a to 1e show the successive stages of plating and brazing to which the silicon-iron material is preferably subjected to form a laminated magnetostrictive material or an element according to this invention.
Figure 1B:
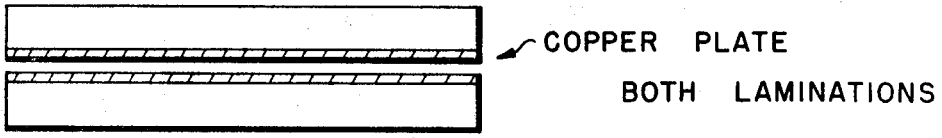
Figure 1C:
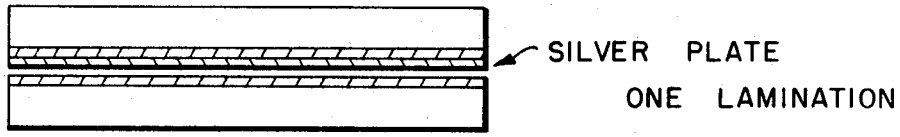

In the invention described in the previously mentioned copending patent application concerning laminated silicon-iron anisotropic magnetostrictive material, the composite material was usually produced by pressure welding, preferably in vacuo, at temperatures between about 750° C. and 900° C.

Pressure welded material and elements are satisfactory to a degree. However, it has been determined in accordance with the present invention that improved joining between silicon-iron laminations or layers are obtained without detrimentally affecting the temperature stability of the composite material by the use of certain copper-silver alloys. It has also been determined in accordance with this invention that the preferred technique for preparing a silicon-iron material with a copper-silver alloy of the composition contemplated herein is by diffusion brazing. This technique allows precise control over braze thickness as well as composition of the joining copper-silver alloy. Therefore, the invention will be described primarily in terms of the brazing technique although it is not limited thereto insofar as the material and elements per se are concerned generally.

BRAZING TECHNIQUES

Referring to FIG. 1, the successive stages of treatment for the silicon-iron layers, which are ultimately joined to form the laminated magnetostrictive material, are schematically shown. As can be seen from the figure, the first step is to copper plate each lamination, at least on the surfaces to be joined, as shown in FIG. 1b. Next, at least one of the laminations is silver plated as shown in FIG. 1c. The two laminations are then held together as shown in FIG. 1d, and heated under pressure to a temperature above the copper-silver eutectic for a time sufficient to allow substantial diffusion of the copper and silver layers into each other and to produce a sound braze by formation of the appropriate copper-silver alloy as schematically indicated in FIG. 1e.

SURFACE PREPARATION

Silicon-iron sheet as commercially available is covered by an insulating film believed to be mainly silica produced by oxidation. In order to achieve the best joint between the laminations it is preferred that the oxide layer be removed. As a first step in the surface preparation it is therefore recommended that the silicon-iron be pickled in a hydrofluoric acid solution as indicated in the flow diagram of FIG. 2. Further optional cleaning steps are also indicated in the figure. For the best plating results, the optional steps are desirable and therefore preferred. If the entire procedure described in the flow diagram is rigorously followed, sound coherent platings will be consistently laid down thereby providing the basis for a strong diffusion brazed joint in the laminated material.

PLATING PROCEDURES

Although many copper and silver plating baths, such as acidic sulphate baths, are known in the art which may be used satisfactorily in practicing this invention, some minor problems have been experienced in consistently preparing adherent copper and silver layers due to the evolution of gas at the plated surfaces. This, of course, affected the reproducibility and consistency of the final plated material. Reliable platings have been produced most consistently when alkaline cyanide baths were used. They are therefore the preferred baths in connection with this invention. The preferred method consists of flash plating the silicon-iron material with a copper plating bath having the composition substantially as shown in the table of FIG. 3 before building up the desired copper thickness in a separate plating operation. Following the copper flash plating, the silicon-iron is then plated to the desired thickness in a bath having the composition substantially as shown in the table of FIG. 4. Finally, one of the two silicon-iron laminations is silver plated in a bath having the composition substantially as shown in the table of FIG. 5. It is convenient to place all the desired amount of silver on one lamination. However, separate portions of the total predetermined amounts of silver required to form any desired copper-silver alloy in accordance with this invention may be placed on each lamination if desired.

It should be noted that these baths are preferred since they have been found to provide the most consistent results as far as sound plating is concerned. The baths are by no means critical to the method, material or elements according to the invention in its broadest sense since many other baths may be used with varying degrees of success.

To prepare brazes of controlled thickness and composition the laminations were first weighed after cleaning and then after plating to insure that the desired predetermined amounts of copper and silver were deposited to form the desired copper-silver alloy. The weights observed were always found to be very close to those calculated from Faraday's law relating weight to electric current and time, so in practice it is possible to monitor plating by electrical measurement if desired rather than by weighing procedures in order to provide the desired predetermined amounts of copper and silver to achieve desired copper-silver compositions.

FURNACE BRAZING

Figure 1D:
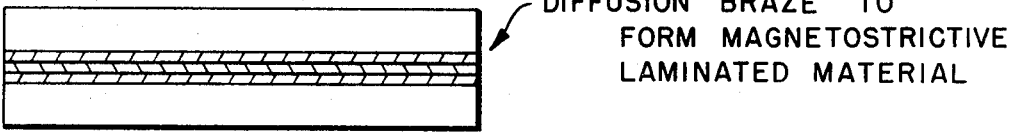
Figure 1E:
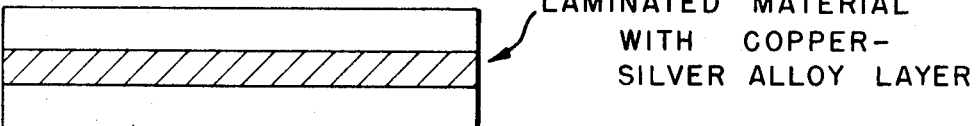

After the laminations have been plated with the desired predetermined amounts of copper and silver, they are placed together as shown in FIG. 1d. Brazing is carried out at a temperature and time sufficient to effect substantial diffusion between the silver and copper layers thus forming substantial amounts of a silver-copper alloy between the laminations. For example, a preferred brazing procedure may be carried out in a reducing atmosphere such as hydrogen at a temperature of about 800° C. for one hour as a practical brazing program. During this procedure, the laminations are preferably subjected to a pressure of a few p.s.i. by placing a mild-steel weight on them. In practice, it was found that the most sound brazes produced by this technique had a minimum thickness of .001 inch copper-silver plating. Thinner brazes are of course possible with higher applied pressures, temperature and time when closer contact between the lamination surfaces is to be expected.

MAGNETIC AND THERMAL DEFLECTION MEASUREMENTS

To assess the magnetic and thermal deflections of laminated silicon-iron magnetostrictive material prepared with copper-silver joints, 3% silicon-iron samples were prepared by pressure welding to act as reference standards since pressure welded material is the best heretofore available in the art. Seven samples were prepared from different areas of 3% silicon-iron sheet in order to take account of material variation. The magnetic deflections observed for the pressure-welded samples are shown in FIG. 6 along with thermal deflections measured on two of the typical pressure-welded samples. It should be noted that a spread of about 20% in magnetic deflection measurements exists but that no significant thermal deflections were observed. These results were used as a basis from which to evaluate samples wherein the laminations are joined by certain copper-silver alloys in accordance with this invention.

Reference is now made to FIG. 7 which shows the copper-silver equilibrium diagram with several specific compositions superimposed thereon. These compositions represent various copper-silver alloys which were used in joining several silicon-iron laminations to provide experimental samples for evaluation. As can be seen from the figure, test samples were made using copper-silver alloys covering the range of about 33% silver up to about 80%, with one alloy of eutectic composition at about 72% silver. The alloys lying to the high silver side of the eutectic composition are hereinafter referred to collectively as the "silver-rich" alloys whereas the alloys lying to the lower silver content side of the eutectic composition are referred to collectively hereinafter as the "copper-rich" alloys.

The testing results of the samples indicated on the diagram in FIG. 2 are shown in FIGS. 8 and 9 which depict the observed magnetic and thermal deflections respectively. From FIG. 9 it is clear that some of the as-brazed samples are markedly temperature sensitive. Two observations may be made from this figure. First, silver-rich alloys yield large temperature deflections but exhibit little permanent set after being subjected to thermal cycling. Secondly, copper-rich alloys yield small temperature deflections but exhibit considerable permanent set after thermal cycling.

Based on this data alone it is not clear whether these phenomena are inherent in the laminated material or merely due to stresses quenched in from brazing. Therefore several samples are discussed below which were carefully annealed at about 500° C. for one hour and slow cooled before remeasurement.

Thermal deflections observed on annealed samples are shown in FIGS. 10 through 13. In each case several temperature cycles between about 75° F. and about 250° F. were made while deflections were measured. From FIG. 10 it can be seen that the 33% silver alloy exhibits shakedown behavior with permanent deformation taking place on the first two temperature cycles. However, negligible deformation appears in subsequent temperature cycles. From FIG. 11 is can be seen that similar behavior was exhibited by a 66% silver alloy that a slight temperature sensitivity remained after shakedown. The behavior of the eutectic alloy (72% silver) is shown in FIG. 12 and interestingly exhibits no shakedown at all and only very slight temperature sensitivity. On the silver-rich side of the eutectic composition, the 80% silver alloy exhibits very marked temperature sensitivity as may be seen from FIG. 13.

All of these observations are summarized in FIG. 14 which shows the observed slopes of the deflection/temperature curves for the samples in all three conditions: after formation of the alloy by brazing (as-brazed), after brazing and annealing (after anneal) and after brazing, annealing and shakedown (after shakedown). It can be seen that the deflection for a given temperature change of about 100° F. increases very rapidly as the alloy composition shifts to the silver-rich side of the eutectic and that shakedown effects occur in alloys of all compositions.

GENERAL DISCUSSION

Considering the data presented herein on the laminated silicon-iron material prepared with various copper-silver alloys, three points are of primary significance.

First, the magnetic deflections observed in the brazed material joined by copper-silver alloys tends to be lower than those noted in pressure-welded material. However, the effect is smallest in the case of the copper-rich alloys.

Secondly, a shakedown effect occurs during temperature cycling of the material using silver-copper alloys as a joining layer. Permanent deflections were observed at the end of the first few thermal cycles but purely elastic behavior was observed during subsequent thermal cycles, particularly for the material formed with the copper-rich alloys.

Thirdly, marked temperature sensitivity was noted in material using silver-rich alloys.

There seems to be no clear explanation as to why the material using copper-silver alloys should show smaller magnetic effects than the pressure-welded material unless the copper-silver layer exerts some effect analogous to an air-gap in a magnetic circuit. However, even then, it is difficult to understand why silver-rich alloys tend to reduce magnetic deflection to a greater extent than copper-rich alloys.

Microscopic examination helps to partially explain the temperature sensitivity of the material using the silver-rich alloys and the relative insensitivity of those using the copper-rich ones. On either side of the eutectic composition the braze microstructure consists of free copper on one side and free silver on the other, with small quantities of eutectic alloy interspersed among the pure metal grains. Since the thermal expansion coefficient of copper is closer to that of silicon-iron than is that of silver, the third point discussed herein above is perhaps more understandable. Values of linear thermal expansion coefficients are:

$Cu = 9.2 \times 10^{-6}/°$ F.
$Ag = 10.9 \times 10^{-6}/°$ F.
$Si\text{-}Fe = 6.5\text{-}7.0 \times 10^{-6}/°$ F.

With regard to shakedown, it appears reasonable to conclude from FIG. 14 that the effects are of similar magnitude for both silver-rich and copper-rich alloys but are more noticeable in the latter case since that temperature sensitivity is much smaller. It is difficult to see how shakedown can be prevented and in practice it is probably better to make certain that it is substantially complete by temperature cycling the material before use.

Finally, some consideration should be given as to which composition of the copper-silver alloy is most suitable for commercial use. On the face of it the eutectic composition is the most satisfactory from the point of view of thermal stability. It shows no significant shakedown and is only slightly temperature sensitive. It should be noted however that a small change in composition during fabrication will bring the eutectic composition into the silver-rich region of the equilibrium diagram and for this reason it might in practice be preferable to use a copper-rich alloy composition. Although subject to shakedown, the copper-rich composition and the laminated material prepared therewith exhibits good magnetic behavior, is temperature insensitive and slight inaccuracies in braze composition or other metallurgical preparation are not expected to affect the characteristics of resultant magnetostrictive elements very much.

It is therefore apparent that this invention provides a commercially acceptable laminated silicon-iron material having properties as good as the pressure silicon-iron material the fabrication of which is not generally acceptable from a commercial standpoint. It is also apparent to those familiar with this art that many modifications of this invention are possible particularly in connection with the configurations actually used for magnetostrictive elements. It should therefore be understood that the invention is not to be limited by the embodiments shown but only by the scope of the following claims.

The embodiments of the invention in which an exclusive property or right is claimed are defined as follows:

1. A laminated magnetostrictive material comprising a plurality of polycrystalline silicon-iron laminations joined by a copper-rich, copper-silver alloy, the laminations containing different crystal alignments and being arranged so that the laminated material will flex in response to a magnetic field.

2. The laminated material of claim 1 wherein the alloy comprises at least about 28% copper by weight, balance essentially silver.

3. The laminated material of claim 1 wherein the alloy comprises greater than about 28% copper by weight, balance essentially silver.

4. The laminated material of claim 2 wherein the laminations comprise an alloy of about 3% silicon, balance essentially iron.

5. The laminated material of claim 1 wherein the copper-silver alloy comprises between about 28% up to about 67% copper by weight, balance essentially silver.

6. The laminated material of claim 5 wherein the laminations comprise an alloy of about 3% silicon, balance essentially iron.

References Cited

UNITED STATES PATENTS

| | | | |
|---|---|---|---|
| 2,387,903 | 10/1945 | Hensel | 29—196X |
| 2,539,246 | 1/1951 | Hensel | 29—199X |
| 2,698,813 | 1/1955 | Pun Kien Koh | 29—196X |
| 2,753,623 | 7/1956 | Boessenkool | 29—196.3 |
| 2,953,844 | 9/1960 | Gelb | 29—196X |
| 3,102,793 | 9/1963 | Alban | 29—195.5 |
| 3,378,357 | 4/1968 | Alban | 29—183.5 |

HYLAND BIZOT, Primary Examiner

U.S. Cl. X.R.

29—199; 2—196